US008660689B2

(12) United States Patent
DeLucia

(10) Patent No.: US 8,660,689 B2
(45) Date of Patent: Feb. 25, 2014

(54) VENDING KIOSK

(71) Applicant: Donald B DeLucia, Boca Raton, FL (US)

(72) Inventor: Donald B DeLucia, Boca Raton, FL (US)

( * ) Notice: Subject to any disclaimer, the term of this patent is extended or adjusted under 35 U.S.C. 154(b) by 0 days.

(21) Appl. No.: 13/953,799

(22) Filed: Jul. 30, 2013

(65) Prior Publication Data

US 2013/0317644 A1 Nov. 28, 2013

Related U.S. Application Data

(63) Continuation of application No. 12/924,464, filed on Sep. 28, 2010.

(60) Provisional application No. 61/248,477, filed on Oct. 4, 2009.

(51) Int. Cl.
*G06F 17/00* (2006.01)

(52) U.S. Cl.
USPC ............................ 700/242; 700/231; 700/244

(58) Field of Classification Search
USPC .................................. 700/231, 232, 242, 244
See application file for complete search history.

(56) References Cited

U.S. PATENT DOCUMENTS

| | | | | |
|---|---|---|---|---|
| 4,628,974 | A * | 12/1986 | Meyer | 700/242 |
| 6,295,767 | B1 | 10/2001 | Barnhill, Jr. et al. | |
| 6,416,270 | B1 * | 7/2002 | Steury et al. | 700/242 |
| 6,597,970 | B1 | 7/2003 | Steury et al. | |
| 6,694,221 | B2 | 2/2004 | Chavez et al. | |
| 7,174,310 | B2 | 2/2007 | Bartholomew et al. | |
| 7,185,809 | B2 * | 3/2007 | Barton et al. | 705/16 |
| 7,630,788 | B1 | 12/2009 | Reese | |
| 7,832,637 | B2 | 11/2010 | Nguyen | |
| 7,857,161 | B2 | 12/2010 | Pinney et al. | |
| 7,922,072 | B2 * | 4/2011 | Hassenzahl | 221/8 |
| 8,145,351 | B2 | 3/2012 | Schininger et al. | |
| 8,195,328 | B2 | 6/2012 | Mallett et al. | |

OTHER PUBLICATIONS

Office Action of Sep. 4, 2012 from U.S. Appl. No. 12/924,464.
Office Action of May 24, 2013 from U.S. Appl. No. 12/924,464.

* cited by examiner

*Primary Examiner* — Timothy Waggoner
(74) *Attorney, Agent, or Firm* — Altman & Martin; Steven K Martin

(57) ABSTRACT

An open merchandise, multi-cubicle display, vending kiosk, custom-fabricated from a plurality of visually open materials and sized to suit the products being sold. The kiosk provides a self-service customer purchase via a barcode scan or touch selector, payment facilitator, and integrated computer assembly with programming to control the kiosk. Also incorporated are audio components which attract customers to the kiosk and a webcam video device which observes the kiosk environment, serves the kiosk's security and can provide customer inquiries to a remote manager via a VoIP communication feature. When necessary, wireless Internet components connect the kiosk functions to process financial transaction services, or to a remote manager for the kiosk's inventory, records management, and programming functions. In addition to its vending attributes, the kiosk has a full closure curtain with a tubular motor which secures the kiosk after business hours.

11 Claims, 10 Drawing Sheets

VENDING KIOSK

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

This invention is in the field of merchandise vending kiosks.

2. Description of the Related Art

Vending machines or vending kiosks of the prior art have products seen or unseen and encapsulated within a closed structure. Vending devices of the prior art have electro-mechanical product delivery methods.

BRIEF SUMMARY OF THE INVENTION

This invention utilizes a plurality of open merchandise display cubes, integrated with a barcode scanner, touch selector, financial transaction facilitator, audio and video components and computer assembly in concert with a purchaser's self-service delivery action to vend products.

This vending kiosk invention provides an open merchandise, self-service sale and product delivery transaction without the need for a sales clerk, or cash register employee.

A typical application of this invention would be to serve as a plush toy display vending kiosk in a children's hospital gift shop, or other location where attending sales staff may be in short supply.

DETAILED DESCRIPTION OF THE INVENTION

The present application hereby incorporates by reference in its entirety U.S. Provisional Patent Application No. 61/248,477, on which this application is based.

The present invention is an open merchandise vending kiosk which is custom designed in a plurality of styles consisting of a multi-cubicle, varying in size, touchable product display and storage structure, combined with a touch screen display selector, barcode scanner, point of sale transaction payment facilitator, webcam, VoIP/video phone, wireless internet modem, relays and related components, all of which are controlled via an on-board integrated computer assembly with special operating software.

Also incorporated into the invention are audio marketing devices designed to attract purchasers to the displayed merchandise with unique sounds, digital signage capabilities and visual display graphics components. The kiosk's audio and video features can transmit a real-time visual image of a customer and status of a sale, or interact with a product purchaser, or communicate a customer's inquiry, or transmit the kiosk's operating environment and operations status to a remote manager.

The invention also has a motorized, rollable full closure curtain covering which secures the merchandise display and kiosk's electronic components after business hours.

During the course of this description like numbers will be used to identify like elements according to the different views which illustrate the invention. This application considers and refers to the optional kiosk design decisions for the walls, sides, security curtain, cube sizes, skeletal frame design, overall size and all materials as kiosk 'styles'.

Figure 1:
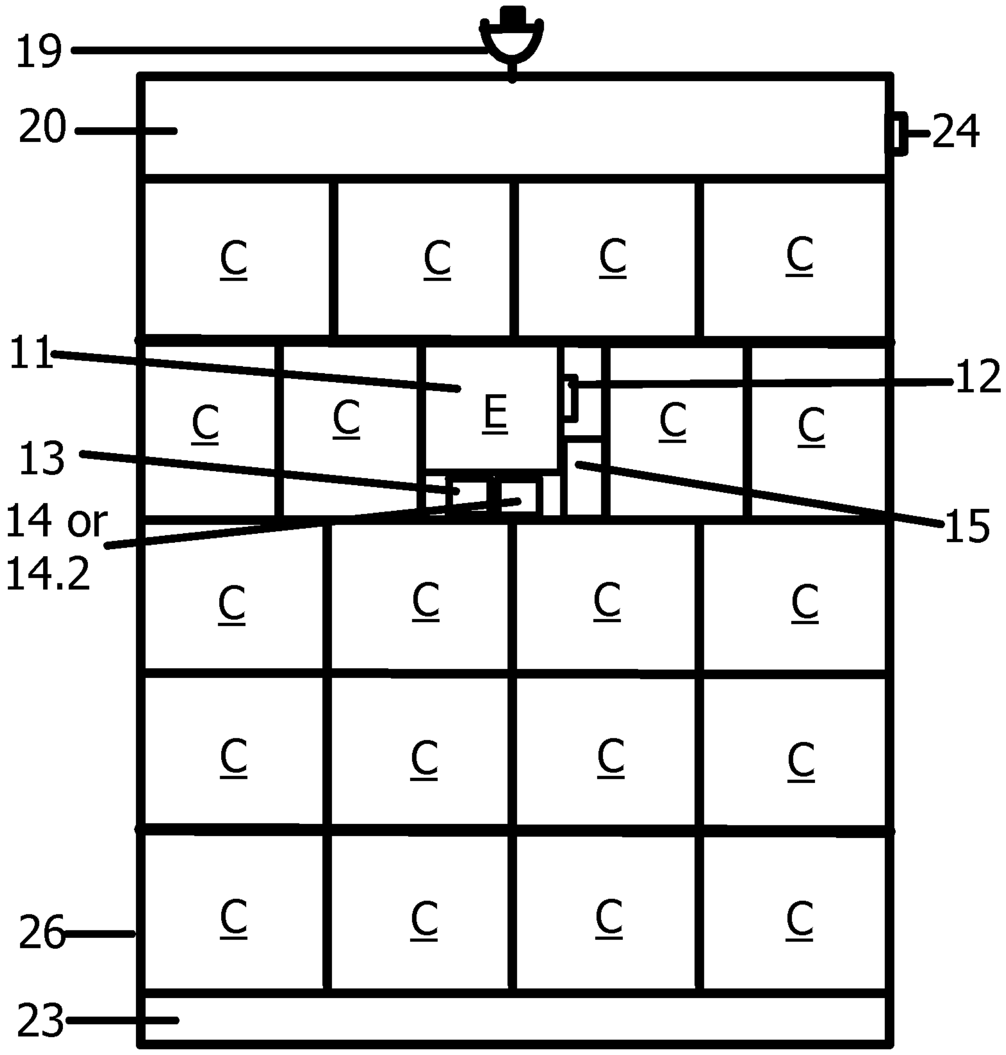
FIG. 1 is a front view of the present invention in a 21 cube, optional clear acrylic material style.
Figure 2:
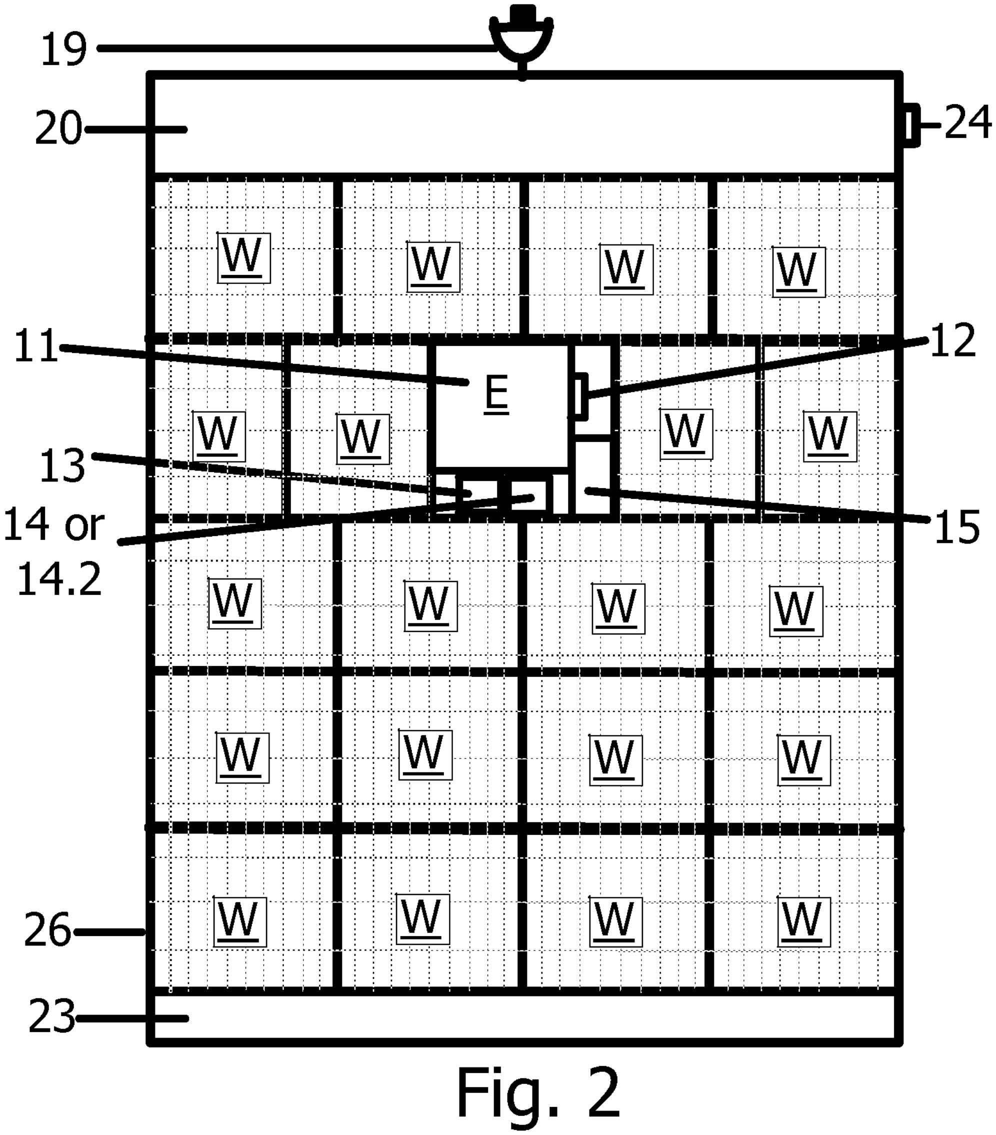
FIG. 2 is a front view of the present invention in a 21 cube, optional rigid wire mesh material style.

Referring now to the invention in further detail in FIGS. 1 and 2, there is shown a rectangle kiosk display structure with a plurality of front open internal cubicles types C and W, which hold and display touchable merchandise products and are made from a plurality of optional materials held by a structural skeletal frame, FIGS. 1-10, element 26 which is also made from a plurality of materials.

Figure 4:
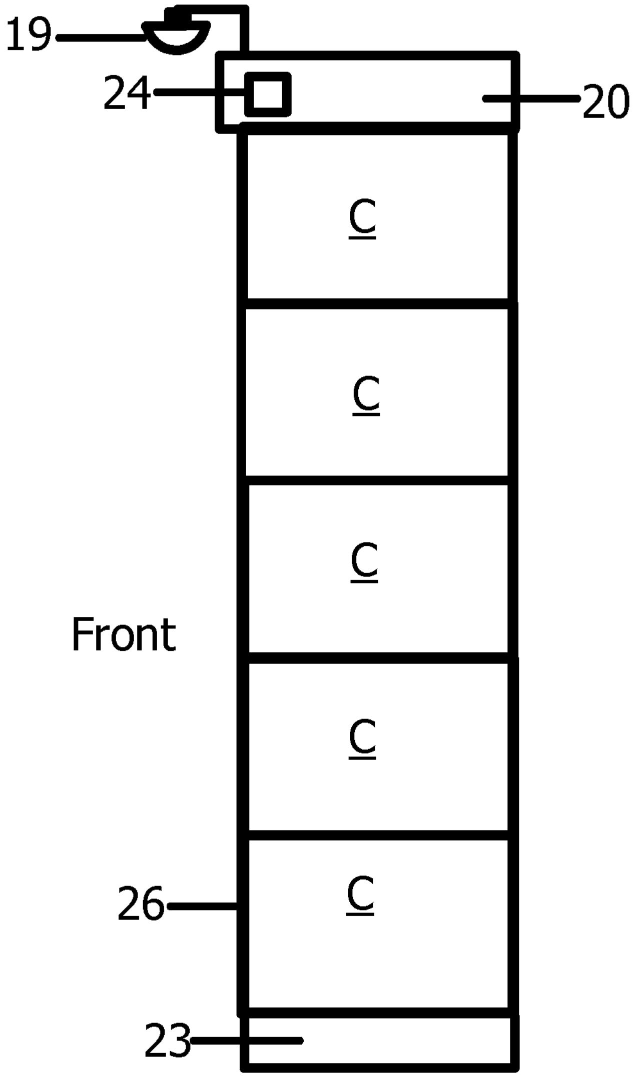
FIG. 4 is a side view of the present invention with optional clear acrylic material style cubes.
Figure 7:
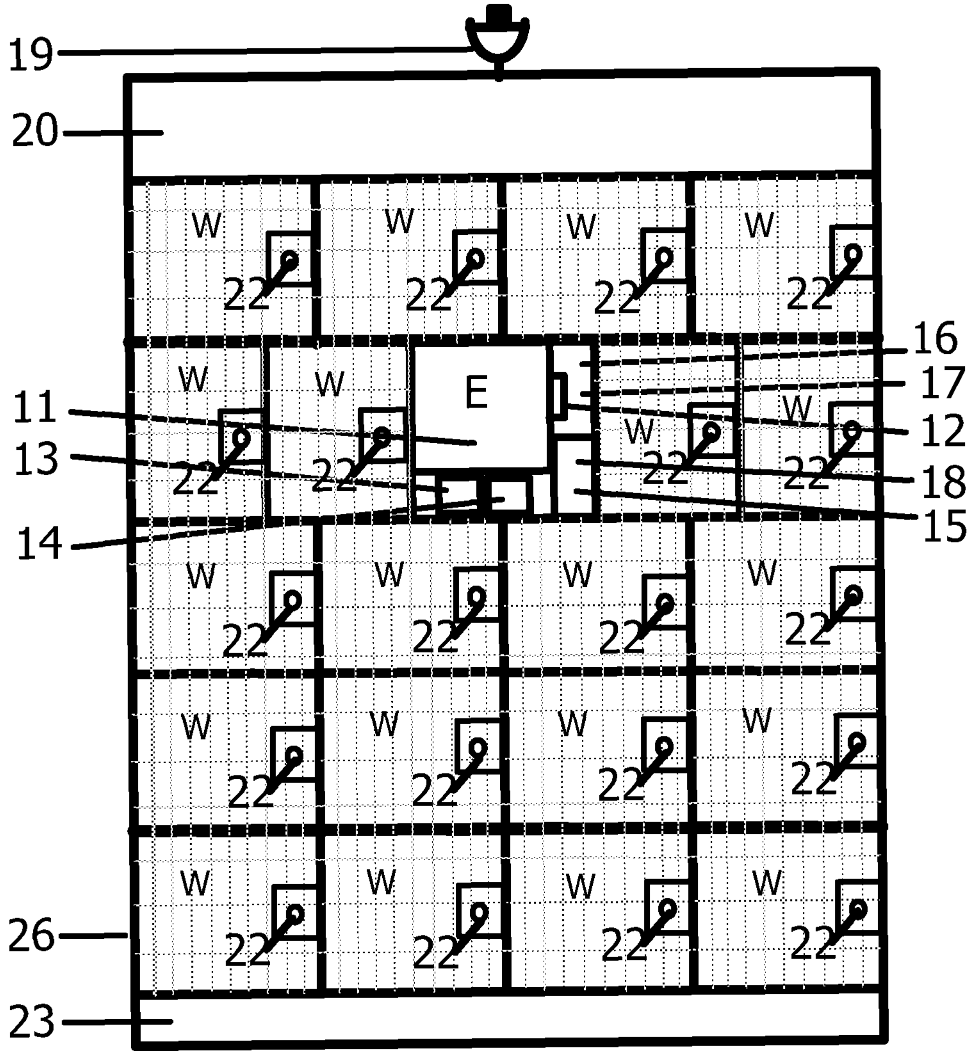
FIG. 7 is a back view of the present invention with optional clear acrylic material style cubes.

In more detail, the kiosk's cubes may be a clear solid material style, FIGS. 1, 4 and 7, cube type C, whereby the bottom, sides, back and top of the kiosk cubes can be made of a plurality of visually clear, solid materials such as, but not limited to, glass, Plexiglas, or other acrylic and the like.

Figure 5:
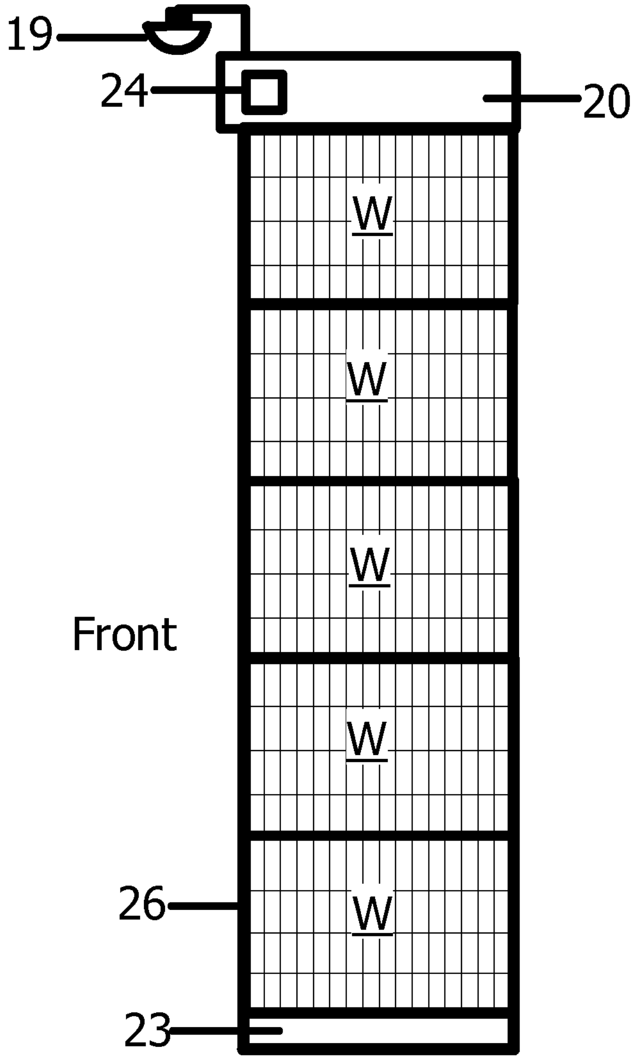
FIG. 5 is a side view of the present invention with optional rigid wire mesh material style cubes.
Figure 8:
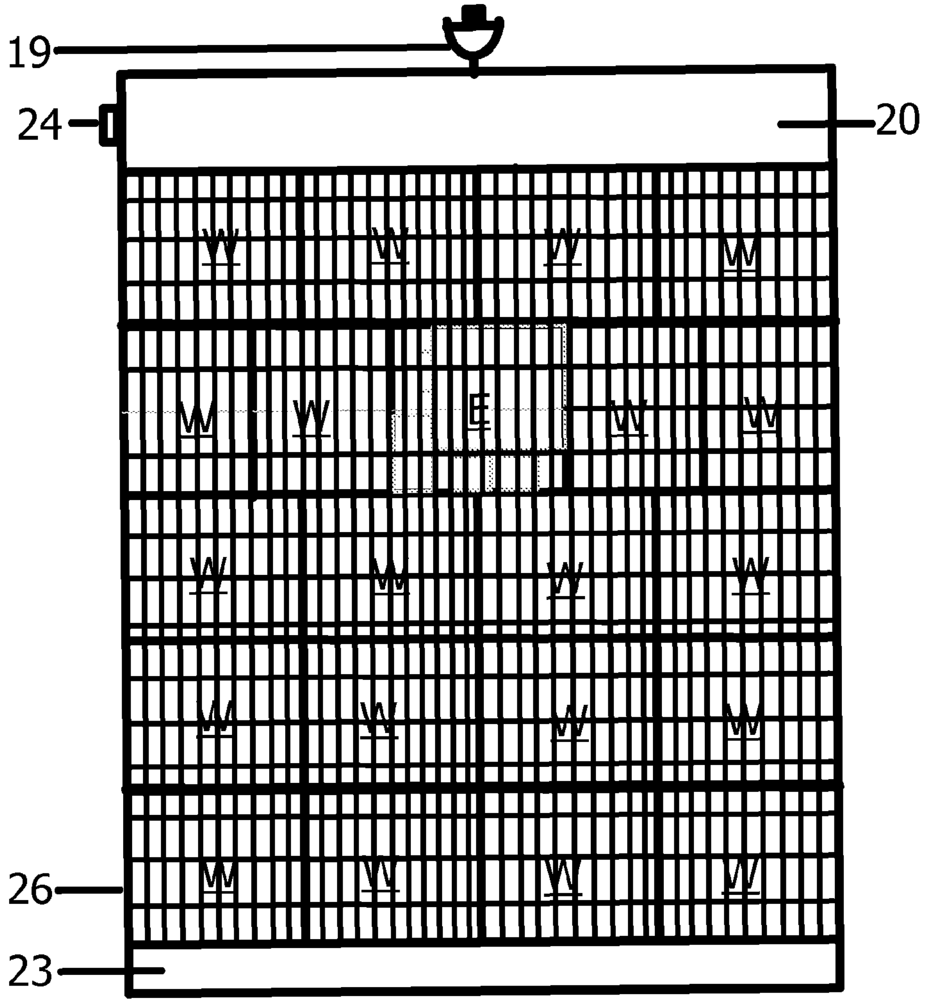
FIG. 8 is a back view of the present invention with optional rigid wire mesh material style cubes.

In more detail, another style for the kiosk's cubes bottom, sides, back and top may be made with a plurality of visually open, rigid wire mesh sizes and materials, FIGS. 2, 5 and 8, cube type W, such as, but not limited to, aluminum, composite, sturdy plastic, stainless steel, or other metal and the like, being either painted, or not.

The kiosk's structure is a composite of multiple internal cubes which are constructed in a self-supporting horizontal and vertical design and are also fastened together and held within a custom fabricated structural skeletal frame, FIGS. 1-10, element 26, whereby the stacked formations of the combined rectangle cubicles attached to the frame become the kiosk unit.

The display cubicles and other elements of the kiosk structure are fastened together in a plurality of ways with a plurality of materials, such as but not limited to, adhesives, epoxies, welds, screws, metal clips, and the like, depending on the kiosk material style used.

In more detail, the kiosk's display cube materials, structural dimensions, mesh sizes and quantity used are optional style elements and custom designed from a plurality of materials which are best adaptable according to the products to be sold and requirements at the display merchandising location.

For example, if food products are being sold in a food cafeteria environment, stainless steel may be the required cube material, or if plush toy animals are sold in a hospital gift shop, open rigid painted wire cage material may be preferred, or men's shirts in an airport display may best be sold in either clear acrylic, or glass cubes.

The construction specifications, securing methods, bottom weighting and support framing, if necessary, may vary depending on several conditions, such as but not limited to, the kiosk material style used, size of the structure and structure's location and other requirements, which may also be subject to applicable local codes.

The kiosk structure may be constructed as either a one piece unit and delivered intact, or prefabricated with the cubicles, structural elements and electronic components parts securely assembled at the install location.

The width, height and depth of the kiosk structure is optional, depending on the products to be sold, electronic component's needs and install location space requirements. The display cubes sizes do not all need to be equal, as long as the structure's overall perimeter forms a rectangle. For the purpose of this application's illustration's size example, the invention structure is a 21 cube style kiosk with 15" square cubes stacked 4 cubes wide by 5 cubes high, plus an 8" high top compartment and 3" bottom compartment, plus 1" skeletal frame which is then a 62" wide×88" high×26" deep cube kiosk.

Referring now to the invention in further detail, depending on the kiosk style, the kiosk's structural skeletal frame, FIGS. 1-10, element 26, may be made of a plurality of structural sizes and materials, such as, but not limited to, aluminum, rigid plastic, composite, wood, steel, or other metal and the like, either painted, or not, and fabricated in either tubular, solid, or modular design types. The kiosk's skeletal frame secures the cubes and structurally supports the kiosk's electronic and mechanical components. For purpose of this application's illustration, the structural skeletal frame in FIGS. 1-10, element 26 is a 1" square, hollow aluminum extrusion material.

In more detail, connecting cables and wires either travel through a hollow structural frame, or in an inconspicuous conduit attached to the frame and according to code requirements, if necessary.

Figure 3:
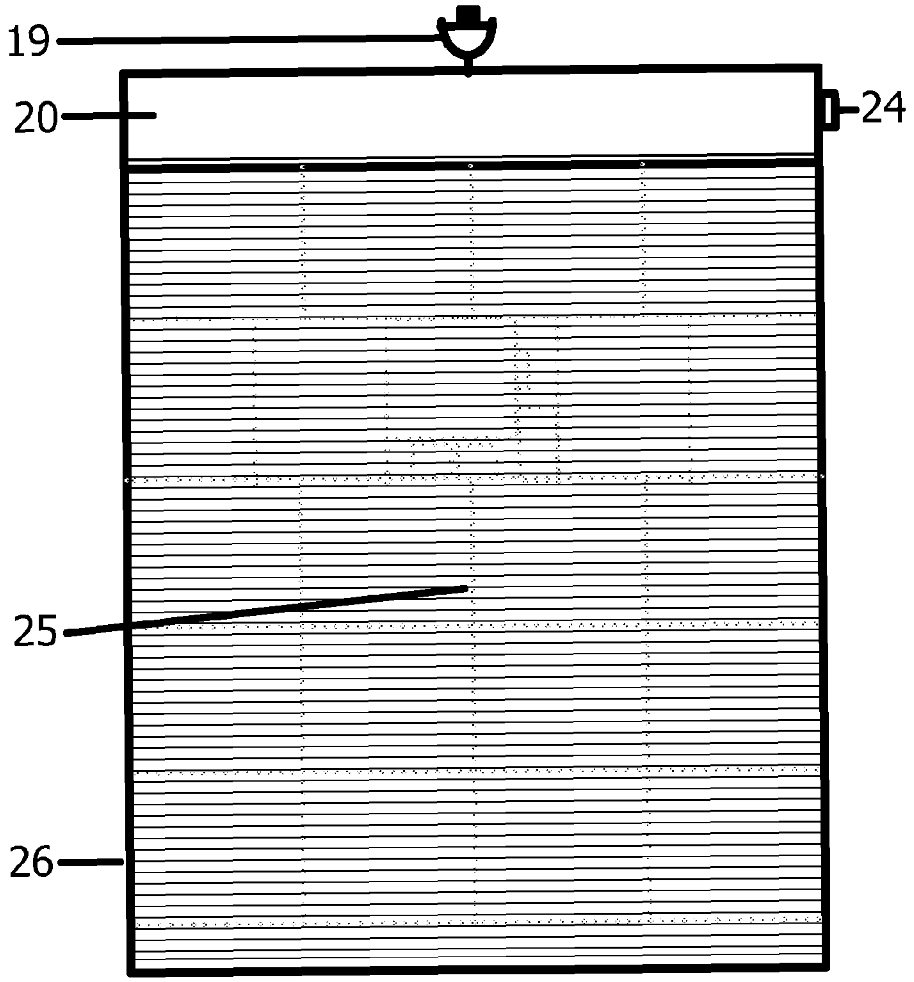
FIG. 3 is a front view of the present invention with a full closure security curtain closed over a 21 cube kiosk which could be either an optional clear acrylic, or rigid wire mesh material cube style.
Figure 6:
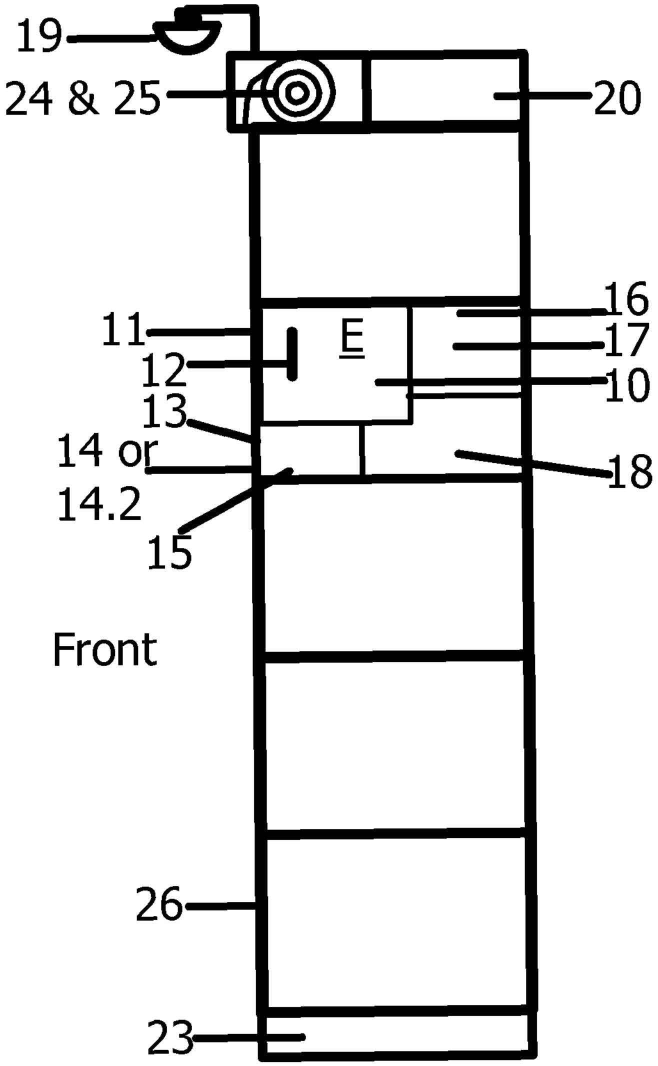
FIG. 6 is a side cut-a-way composite elements view of the present invention which could be in either an optional clear acrylic, or rigid wire mesh material cube style.
Figure 9:
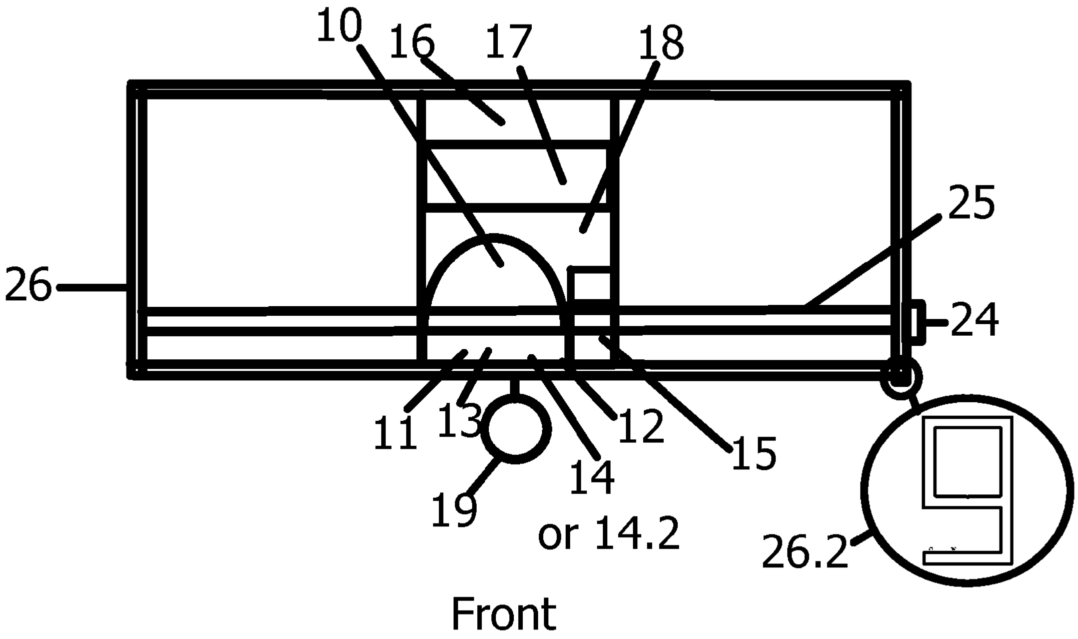
FIG. 9 is an open top down cut-a-way composite elements view of the present invention which could be in either an optional clear acrylic, or rigid wire mesh material cube style.
Figure 10:
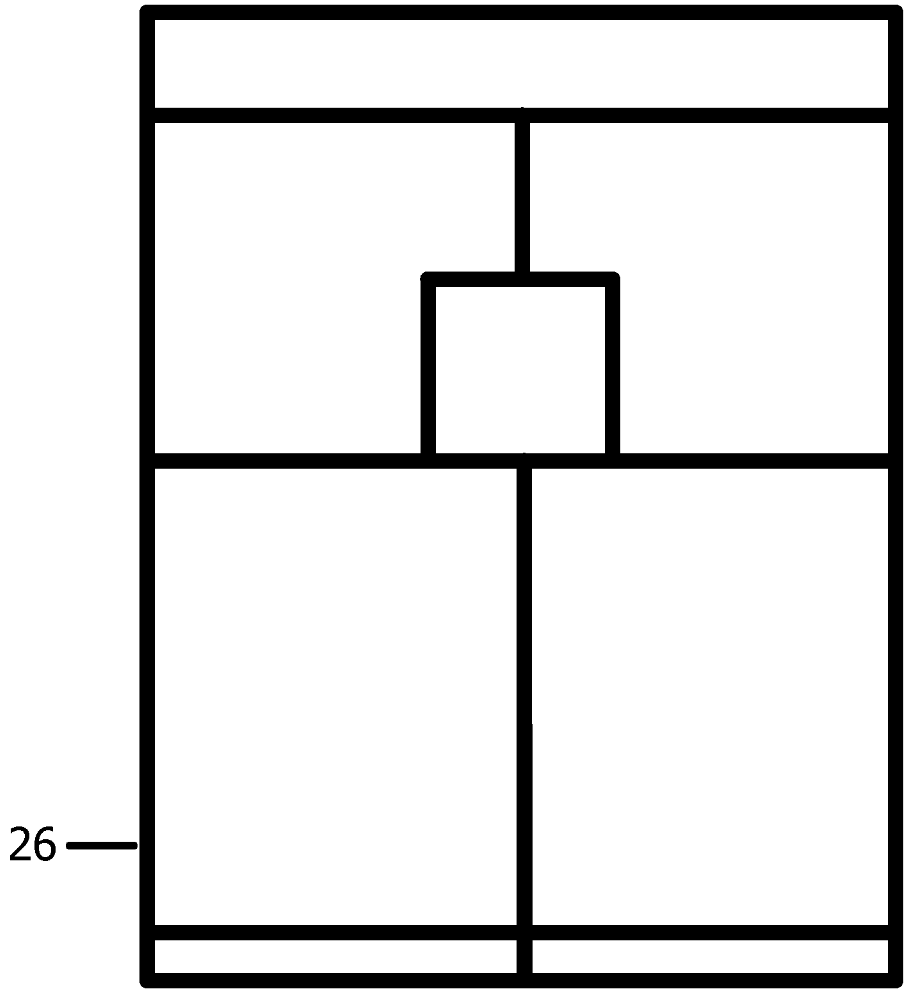
FIG. 10 is a front view of the present invention's typical structural skeletal frame design.

In more detail, still referring to the structural skeletal frame, FIGS. 1-10, element 26, when the frame is made with aluminum, or other metals and the kiosk style has a full closure security curtain, FIGS. 3, 6 and 9, element 25, the structural frame extrusion has a custom design at the kiosk's front side opening, FIG. 9, drawing insert element 26.2. The custom frame extrusion opening provides a built-in channel to secure the curtain sides and serves as side guides for the curtain to travel in.

Referring now to the invention in further detail, there is shown a full closure curtain FIGS. 3, 6 and 9, element 25, which secures the display merchandise cubicles and kiosk's electronics components in cube type E after business hours. The curtain may be opened and closed, either manually, or mechanically via a tubular motor, FIGS. 1-9, element 24. Alternatively, if the kiosk is located in a room which is locked after business hours, or additional security is not necessary, the full closure curtain and tubular motor may be omitted.

Referring now to the invention in further detail in FIGS. 1, 2 and 6-8, cube type E, there is shown in the center of the kiosk an electronics components compartment. The electronics components compartment's location in the kiosk unit is optional and may alternatively be in another conveniently accessible cube location. Additionally, the bottom, sides, back and top of cube type E is made of a plurality of solid opaque materials, such as mentioned for the top compartment below.

In further detail, still referring to the electronics compartment cube type E, contained within it is a computer assembly, FIGS. 6 and 9, element 10, a barcode scanner, FIGS. 1, 2 6 and 9, element 13, a touch screen monitor, FIGS. 1, 2, 6 and 9, element 11 and transaction facilitator assembly with various electronic components and peripheral devices, FIGS. 1, 2, 6 and 9, elements 12-18. The electronic components in cube type E provide the kiosk purchase transaction functions, Internet connections, audio and video communications, security devices and consist of, but are not limited to the following described components. More specifically, seen from the kiosk's front view is:

a. A touch screen monitor, FIGS. 1, 2, 6 and 9, element 11, which can be in a plurality of screen sizes according to the kiosk style. The monitor's screen displays images, product descriptions, graphics and price information of the same merchandise which is also being displayed in the kiosk's selection cubes and guides a user to a purchase transaction.

In more detail, the monitor's screen, FIGS. 1, 2, 6 and 9, element 11 first displays individual touch screen product photo buttons which offer a merchandise selection, along with an initial screen messages, such as, "Select an item and scan its barcode, or touch its photo here."

In more detail, when a product selection is made, either via a barcode scan, or the touch screen, another touch screen button then facilitates a point-of-sale purchase transaction using a credit or debit card reader swipe, FIGS. 1, 2, 6 and 9, element 12. Or alternatively, another touch screen button provides information for a cash or check sale using either the cash acceptor, FIGS. 1, 2, 6 and 9, element 14, or check and cash transactions mail-in envelope methods, FIGS. 1, 2, 6 and 9, element 14.2.

In more detail, another touch screen button also provides a screen display for general product purchase, return and warranty information and another touch screen button activates VoIP phone assistance to a remote manager, if necessary. When the VoIP phone is activated, the monitor screen displays a picture in picture, two-way video image, via the kiosk's webcam, FIGS. 1-9, element 19.

In more detail, while the kiosk is awaiting customer interaction, the monitor screen saver can also display digital promotional images to attract customers to the kiosk, or messages to initiate a merchandise selection.

b. A credit and debit card magnetic swipe reader, FIGS. 1, 2, 6 and 9, element 12 processes non-cash sale transaction payments. The card swipe reader facilitates a purchase transaction payment in tandem with the computer assembly, its custom software and the internet modem components.

c. A barcode scanner, FIGS. 1, 2, 6 and 9, element 13 can read a customer's hand-selected merchandise's barcode tag and then interpret the purchase information to the respective item's photo display on the touch screen monitor, which then guides a customer to make a purchase transaction.

d. A cash payment bill acceptor, FIGS. 1, 2, 6 and 9, element 14 accept bills and processes cash sale transaction payments.

In more detail, an alternative cash payment sale method in a trusted sales environment, or donation situation, is a mail-in envelopes holder/drop box facilitator FIGS. 1, 2, 6 and 9, element 14.2, which is provided at the same kiosk cube E location for cash or check payments in lieu of the bill acceptor. Or, if the sales location, merchandise to be sold, or kiosk style does not require cash sale transactions, the cash payment methods may be omitted and only credit and debit cards accepted.

e. Receipt printer, FIGS. 1, 2, 6 and 9, element 15 delivers a sale receipt after each transaction.

In further detail, still referring to cube E, located behind the monitor and transaction facilitator assembly and not seen from the front view are other integrated electronic components which are shown in FIGS. 6 and 9, cut-a-way views, elements 10, and 16-18 such as, but not limited to:

f. Dual-processor computer assembly in FIGS. 6 and 9, element 10 which can be configured in a plurality of operating capacity and software functions according to the kiosk style requirements. The computer assembly facilitates the kiosk's electronic operations and purchase transaction components with inputs from the touch screen monitor, FIGS. 1, 2, 6 and 9, element 11, and activates the appropriate kiosk hardware, relays, switches, devices, and the like via the kiosk's computer's special software programming.

In more detail, the computer assembly functions also maintains the kiosk merchandise inventory records, each sale transaction's financial data and the computer systems programming and maintenance which can all be accessed and managed by either a remote, or on-site kiosk manager.

g. Miscellaneous electronic components and various ancillary computer hardware devices, FIGS. 6 and 9, element 16 serve the kiosk and its computer assembly, such as but not limited to, relays, wiring, battery back-up, power surge suppressor, other accessory devices, and the like.

h. Wireless internet modem and router device, FIGS. 6 and 9, element 17 connects to the Internet via cellular technology, and serves the kiosk computer assembly and its related electronic components in various ways, such as but not limited to, (1) processes credit and debit card purchase transactions, (2) facilitates webcam functions, and (3) transmits the kiosk operations information to a remote manager for security, marketing conditions, programming and maintenance service needs.

i. Audio components, FIGS. 6 and 9, element 18 serve the kiosk functions in various ways, such as but not limited to, (1) create unique marketing sounds and/or music in the proximity area of the kiosk which attract customers to notice the displayed merchandise, (2) provide audio communications between a customer and a remote kiosk manager, and (3) serve as an element of the kiosk's security system components.

Referring now to the top of the kiosk invention is a webcam video device, FIGS. 1-9, element 19 which is located slightly above and protruding out from the top, compartment front, FIGS. 1-9, element 20. The webcam can rotate and serves the kiosk functions in several ways, such as but not limited to, (1) observes potential customer traffic for a remote manager to activate the kiosk's customer attracting audio devices, (2) facilitates VoIP and video communications between a customer and a remote kiosk manager, if necessary, and (3) serves as an element of the kiosk's security system components.

Referring now again to the top of the kiosk invention is a top compartment FIGS. 1-8, element 20, which is formed by the kiosk structural skeletal frame, FIGS. 1-10, element 26 design. The top compartment has a full covering on all sides made from a plurality of solid opaque materials, such as but not limited to, aluminum, acrylic, plastic, composite, wood, other metals and the like depending on the kiosk style.

In more detail, the kiosk's top compartment, FIGS. 1-8, element 20 stores and covers the kiosk's full closure security curtain assembly, FIGS. 3 and 6, element 25, along with the optional tubular motor components, FIGS. 1-9, element 24 and other peripheral devices, if applicable.

In more detail, the kiosk's top compartment, FIGS. 1-8, element 20 also provides an alternate location for electronic components and devices which are not required to be located in cube E. The top covering height is optional depending on the kiosk style and it can be raised reasonably higher, if needed and the install location permits.

In more detail, the top compartment exterior, FIGS. 1-9, element 20 also serves to display signage at the kiosk top.

Referring now to the invention, located at the bottom of the kiosk is a compartment, FIGS. 1-8, element 23, which is formed by the kiosk structural skeletal frame, FIGS. 1-10, element 26. The bottom compartment has a full covering on all sides made from a plurality of solid opaque materials, such as but not limited to, aluminum, acrylic, plastic, composite, wood, other metals and the like depending on the kiosk style.

In more detail, the kiosk's bottom compartment stores and covers fastening devices and weighting materials used to secure and stabilize the kiosk structure, if necessary.

In further detail, referring to the tubular motor assembly, FIGS. 1-9, element 24 which is located at the top of the kiosk and mostly unseen behind the top compartment covering, FIGS. 1-9, element 20. Unless a manual operation is preferred, the optional tubular motor is used for opening and closing the full closure security curtain, FIGS. 3 and 6, element 25, which is then attached and wrapped around the motor mechanism.

In more detail, the tubular motor is controlled by a combination of electronic devices, such as but not limited to, relays, switches, timers and the like. The tubular motor can be activated either manually by a kiosk manager or automatically by the kiosk's integrated computer, FIG. 3, element 10, assembly and its special computer software program, or a timer device.

In further detail, referring to the full closure security curtain, FIGS. 3 and 6, element 25, the covering can be made from a plurality of rollable materials depending on the kiosk's optional styles and the installation location's need, such as, but not limited to, aluminum, sturdy fabric, vinyl, graphite fiber type, or other rollable materials, being either painted, or not and fabricated in a plurality of methods, such as but not limited to, horizontal slat, or link construction, woven, and the like. For the purpose of this application's illustration, a rollable aluminum metal slat full closure curtain, FIG. 3, element 25, covers over either the visually clear, or rigid wire mesh material style.

In more detail, when the kiosk display is open, the full closure curtain retracts into the top compartment covering, FIGS. 1-9, element 20. The security closure curtain can be opened and closed via a tubular motor, or manually by the kiosk manager and without a tubular motor.

In more detail, when the kiosk full closure security curtain is closed, it can visually display advertisements, or other customer attracting graphics and information.

Referring now to the invention, located at the bottom of the kiosk is a compartment, FIGS. 1-8, element 23, which is formed by the kiosk structural skeletal frame, FIGS. 1-10, element 26. The bottom compartment has a full covering on all sides made from a plurality of solid opaque materials, such as but not limited to, aluminum, acrylic, plastic, composite, wood, other metals and the like depending on the kiosk style.

In more detail, the kiosk's bottom compartment stores and covers fastening devices and weighting materials used to secure and stabilize the kiosk structure, if necessary.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

All of the invention's materials and electronic technology components used and mentioned in the previous paragraphs are currently-existing, easily-obtainable consumer products, which in themselves may not be new, but when are combined and assembled as described herein, along with the invention's conceptual ideas make the vending kiosk invention unique.

What is claimed is:

1. A self-service vending kiosk in a kiosk environment, the kiosk comprising:

(a) a plurality of self-service, open cubicles secured in a frame;

(b) an electronics compartment in the frame including a computer assembly having an Internet connection;

(c) a touch screen monitor operationally connected to the computer assembly;

(d) a barcode scanner operationally connected to the computer assembly;

(e) a transaction facilitator operationally connected to the computer assembly for facilitating payment;

(f) a camera operationally connected to the computer assembly and mounted to observe the kiosk environment;

(g) audio devices operationally connected to the computer assembly;

(h) the computer assembly running a program to control the kiosk, the program including (1) a Voice Over Internet Protocol (VoIP) communication function utilizing the monitor, the audio devices, and the camera, and (2) security functions utilizing the camera; and (i) an openable, full closure security curtain that covers the open cubicles to secure the kiosk;

(j) whereby a customer retrieves an item from one of the open cubicles, informs the kiosk which item has been retrieved, and pays for the item using the transaction facilitator.

2. The vending kiosk of claim 1 wherein the size of the cubicles and materials from which the cubicles are made depend on the products being sold.

3. The vending kiosk of claim 1 wherein the transaction facilitator includes a mechanism for receiving payment.

4. The vending kiosk of claim 1 wherein the transaction facilitator includes a receipt printer.

5. The vending kiosk of claim 1 wherein the program includes a scan function for identifying the retrieved item using the barcode scanner.

6. The vending kiosk of claim 1 wherein the program includes a function for identifying the retrieved item using the touch screen monitor.

7. The vending kiosk of claim 1 wherein the VoIP function provides audio and visual communication between a customer and a remote manager.

8. The vending kiosk of claim 1 wherein the program further includes a function controlling the audio devices to provide unique sounds which are intended to attract customer interest to the kiosk.

9. The vending kiosk of claim 1 wherein the Internet connection is via a wireless connection.

10. The vending kiosk of claim 1 wherein the program includes a remote control function for remote control of the kiosk by a remote manager.

11. The vending kiosk of claim 1 wherein the security curtain is operated by a motor.

* * * * *